US009096154B2

(12) United States Patent
Kwon et al.

(10) Patent No.: US 9,096,154 B2
(45) Date of Patent: Aug. 4, 2015

(54) RECLINING APPARATUS OF HEADREST FOR REAR SEAT IN VEHICLE

(71) Applicants: Hyundai Motor Company, Seoul (KR); Kia Motors Corporation, Seoul (KR); Hyundai Dymos Incorporated, Seosan, Chungcheongnam-do (KR)

(72) Inventors: Mi Sun Kwon, Seoul (KR); Jun Yeol Heo, Gyeonggi-do (KR); Ju Hyun Cha, Gyeonggi-do (KR); Jung Sang You, Gyeonggi-do (KR); Seon Chae Na, Gyeonggi-do (KR); Hak Gyun Kim, Gyeonggi-do (KR); Chan Ho Jeong, Gyeonggi-do (KR); Chan Uk Park, Gyeonggi-do (KR); Jin Ho Seo, Gyeonggi-do (KR); Yun Ho Kim, Gyeonggi-do (KR); Myeong Sub Kim, Gyeonggi-do (KR)

(73) Assignees: Hyundai Motor Company, Seoul (KR); Kia Motors Corporation, Seoul (KR); Hyundai Dymos Incorporated, Seosan, Chungcheongnam-do (KR)

( * ) Notice: Subject to any disclaimer, the term of this patent is extended or adjusted under 35 U.S.C. 154(b) by 0 days.

(21) Appl. No.: 13/894,639

(22) Filed: May 15, 2013

(65) Prior Publication Data
US 2014/0159459 A1  Jun. 12, 2014

(30) Foreign Application Priority Data
Dec. 12, 2012  (KR) .................. 10-2012-0144948

(51) Int. Cl.
*B60N 2/48* (2006.01)
*B60N 2/22* (2006.01)

(52) U.S. Cl.
CPC ............ *B60N 2/4852* (2013.01); *B60N 2/2209* (2013.01)

(58) Field of Classification Search
CPC ..................................................... B60N 2/4852
USPC ............................................................ 297/408
See application file for complete search history.

(56) References Cited

U.S. PATENT DOCUMENTS

| 5,011,225 | A  | * | 4/1991 | Nemoto ....................... 297/408 |
| 5,669,666 | A  | * | 9/1997 | Lee .............................. 297/408 |
| 6,511,130 | B2 | * | 1/2003 | Dinkel et al. ................. 297/410 |
| 7,717,507 | B2 | * | 5/2010 | Toda et al. ............... 297/216.12 |
| 7,845,729 | B2 | * | 12/2010 | Yamada et al. ............ 297/284.1 |
| 8,172,329 | B2 | * | 5/2012 | Kim .............................. 297/408 |
| 8,262,164 | B2 | * | 9/2012 | Ito et al. ................... 297/354.11 |
| 2006/0226689 | A1 | * | 10/2006 | Linnenbrink et al. ........ 297/408 |

FOREIGN PATENT DOCUMENTS

| JP | H02-60847 A | 3/1990 |
| JP | 2646379 B2 | 8/1997 |

(Continued)

*Primary Examiner* — Sarah B McPartlin
(74) *Attorney, Agent, or Firm* — Mintz Levin Cohn Ferris Glovsky and Popeo, P.C.; Peter F. Corless (57) ABSTRACT

The present invention relates to a reclining apparatus for a head rest of a rear seat that includes: a reclining motor operably coupled to an integral lead screw; a carrier thread fastened to the integral lead screw; and a link module configured to transmit operation force from the carrier to a head rest module, wherein the head rest module angle is adjusted in a forward/rearward direction by the operation force from the carrier and the link module.

3 Claims, 8 Drawing Sheets

(56) References Cited

FOREIGN PATENT DOCUMENTS

| | | |
|---|---|---|
| JP | 11-005479 | 1/1999 |
| JP | H11-005479 A | 1/1999 |
| JP | 2006-224921 A | 8/2006 |
| JP | 2009-154640 A | 7/2009 |
| KR | 10-0131029 B1 | 11/1997 |
| KR | 10-2003-0060284 A | 7/2003 |
| KR | 10-2009-0055904 | 6/2009 |
| KR | 10-2009-0055904 A | 6/2009 |

* cited by examiner

FIG. 1

Prior Art

FIG. 2

Prior Art

RECLINING APPARATUS OF HEADREST FOR REAR SEAT IN VEHICLE

CROSS-REFERENCE TO RELATED APPLICATION

This application claims under 35 U.S.C. §119(a) the benefit of Korean Patent Application No. 10-2012-0144948, filed on Dec. 12, 2012 in the Korean Intellectual Property Office, the disclosure of which is incorporated herein in its entirety by reference.

BACKGROUND (a) Technical Field

The present invention relates to a reclining apparatus for a headrest of a rear seat, and more particularly, to a reclining apparatus for a headrest of a rear seat in a vehicle which allows adjustment of the angle of the headrest.

(b) Background Art

Figure 1:
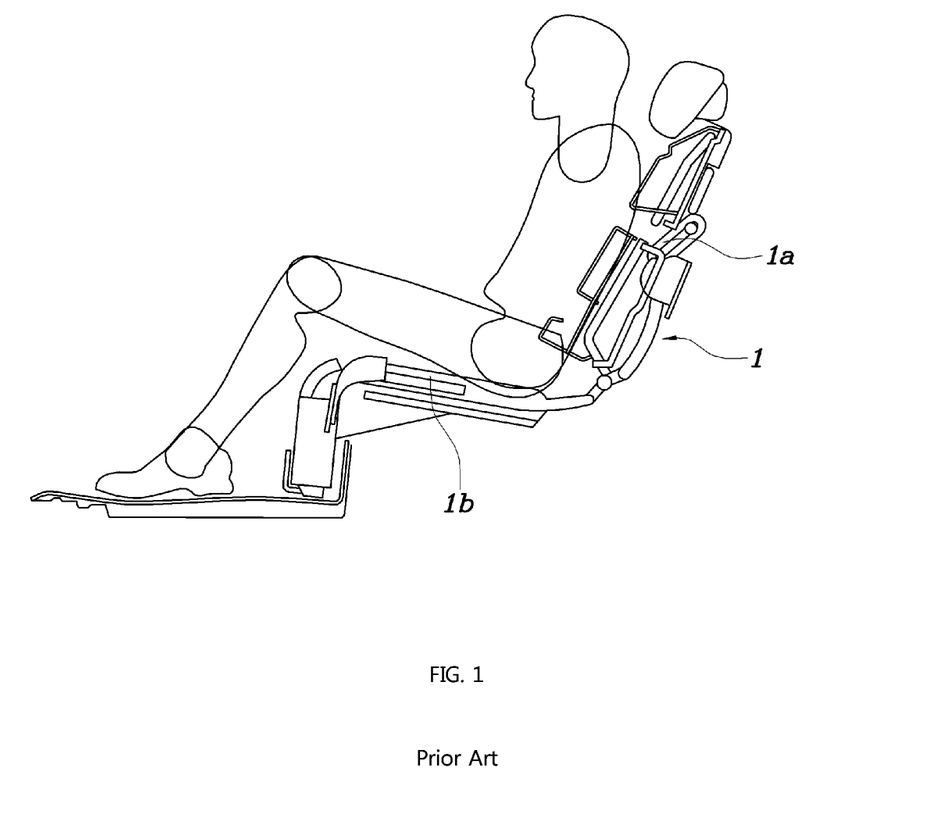
FIGS. 1 and 2 are views illustrating rear seats of the conventional art.

Conventional rear seats 1 in common vehicles are structured such that a seat back 1a and a seat cushion 1b are fixed not to move, as shown in FIG. 1. Unfortunately, this causes passengers to experience discomfort when sitting in the seat for a long time.

Figure 2:
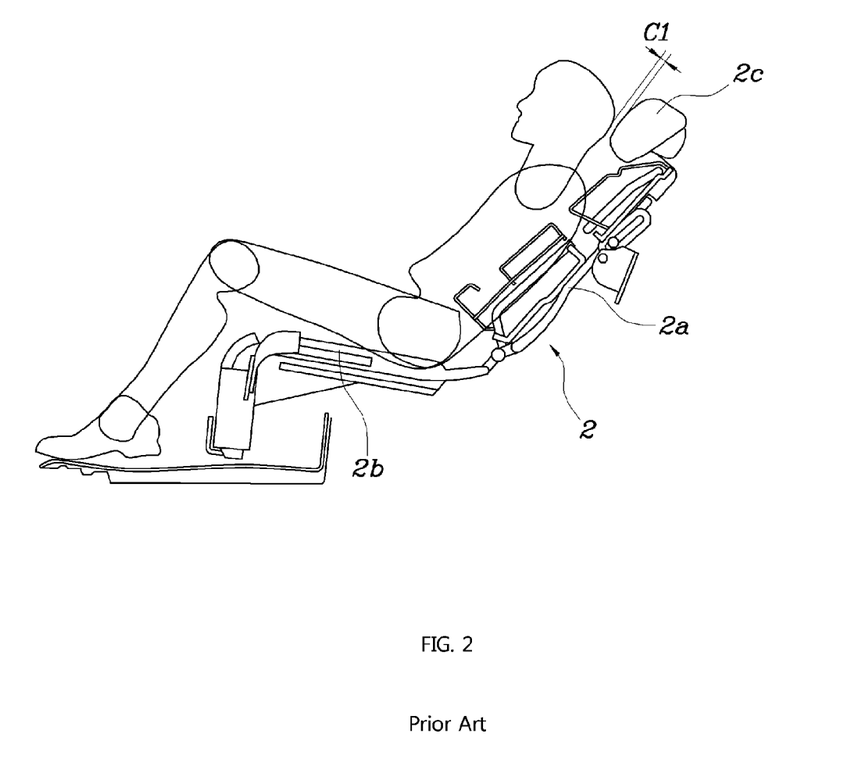

In an attempt to solve the problems associated with rear seats 1, a rear seat 2 having a reclining function that allows a seat cushion 2b to slide forward and adjust the angle of a seat back 2a with the movement of the seat cushion 2b, as shown in FIG. 2, has been developed for some expensive vehicles. However, according to the rear seat 2 of the conventional art, a head rest 2c can be moved only up or down and the angle cannot be adjusted forward/rearward so that a space C1 is formed between the head rest 2c and the passenger's head after reclining of the seat back 2a, and the head rest 2c cannot sufficiently support the passenger's head. Accordingly; the rear seat 2 still has the disadvantage of causing discomfort to a passenger. Additionally, a passenger has to fully lay his/her head rearward to support the head with the head rest 2c after reclining of the seat back 2a, which is inconvenient when the passenger desires to relax while engaged in a forward-looking activity such as, reading, watching a monitor, etc.

Furthermore, it should be noted that the description provided above is merely for aiding in understanding the background of the present invention, and should not be construed as admitted prior art.

SUMMARY OF THE DISCLOSURE

The present invention has been made in an effort to solve the above-described associated with the conventional art, and it is an object of the present invention to provide a reclining apparatus for a head rest of a rear seat in a vehicle which allows forward/rearward adjustment of the angle of the head rest such that the head of a passenger may always be comfortably supported without reclining of a seat back, thereby improving the convenience and comfort of the passenger and also the commercial value of the vehicle.

In order to achieve the above object of the present invention, a reclining apparatus for a head rest of a rear seat, which includes a carrier and a link module that are operated by power from a reclining motor, in which a head rest module that supports the head of a passenger is adjusted in forward/rearward angle by operation force from the carrier and the link module.

The reclining apparatus includes: a reclining motor fixed to a seat back frame and having an integral lead screw that rotates; a carrier thread-fastened to the lead screw and movable up/down along the lead screw that rotates; and a link module provided to transmit the operation force of the carrier to the head rest module and rotating the head rest module forward/rearward such that the angle of the head rest module is adjusted, when the carrier moves up/down.

The head rest module includes: a stay guide connected with the link module; a head rest stay movable along the stay guide through the stay guide; and a head rest integrally connected to the upper portion of the head rest stay.

The link module includes: a link bracket with one end fixed to the upper portion of the seat back frame and the other end protruding down; a lower link with one end rotatably connected to the carrier, the other end rotatably connected to the head rest module, and a middle portion rotatably connected to the link bracket; and an upper link positioned over the lower link, with one end rotatably connected to the link bracket and the other end rotatably connected to the head rest module.

The reclining apparatus further includes a guide frame that has one end fixed to the upper portion of the seat back frame and the other end protruding forward ahead of the seat back frame and through which the head rest stay is vertically disposed to be guided when the angle of the head rest module is adjusted forward/rearward.

A forward stopper that restricts forward movement of the head rest module is integrally formed with the guide frame and the portion, to which one end of the guide frame is coupled, of the seat back frame is a rear stopper that restricts the rearward movement of the head rest module.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

A reclining apparatus of a head rest for a rear seat according to exemplary embodiments of the present invention is described hereafter in detail with reference to the accompanying drawings.

A reclining apparatus for a head rest of a rear seat according to an exemplary embodiment of the present invention, as shown in FIGS. 2 to 8, includes a carrier 30 and a link module 50 that are operated by power from a reclining motor 20, and a head rest module 40 that supports the head of a passenger and can be adjusted in a forward/rearward angle by operation force from the carrier 30 and the link module 50.

That is, the reclining apparatus includes: a reclining motor 20 fixed to a seat back frame and having an integral lead screw 21 that rotates; a carrier 30 thread-fastened to the lead screw 21 and movable up/down along the lead screw 21 that rotates; and a link module 50 provided to transmit the operation force of the carrier 30 to the head rest module 40 and rotating the head rest module 40 forward/rearward such that the angle of the head rest module 40 is adjusted, when the carrier 30 moves up/down.

The head rest module 40 includes a stay guide 41 coupled with the link module 50, a head rest stay 42 formed through, and movable along, the stay guide 41, and a head rest 43 integrally coupled to the upper portion of the head rest stay 42.

Further, the link module 50 includes: a link bracket 51 with one end fixed to the upper portion of the seat back frame 11 and the other end protruding down; a lower link 52 with one end rotatably coupled to the carrier 30, the other end rotatably coupled to the head rest module 40, and a middle portion rotatably coupled to the link bracket 51; and an upper link 53 positioned over the lower link 52, with one end rotatably coupled to the link bracket 51 and the other end rotatably coupled to the head rest module 40.

The lower link 52 may be rotatably coupled to a side of the carrier 30 by a first hinge pin 61, rotatably coupled to the stay guide 41 constituting the head rest 40 by a second hinge pin 62, and rotatably coupled to the link bracket 51 by a third hinge pin 63.

The upper link 53 may be rotatably coupled to the link bracket 51 by a fourth hinge pin 64 and rotatably coupled to the stay guide 41 constituting the head rest module 40 by a fifth hinge pin 65.

As the reclining motor 20 drives to rotate the lead screw 21 and the carrier 30 may be moved over the seat back frame 11 along the lead screw 21, the lower link 53 rotates such that the first hinge pin 61 moves up and the second hinge pin 62 moves down with respect to the third hinge pin 63.

As the lower link 53 rotates, the head rest module 40, including the stay guide 41, moves such that the head rest 43 protrudes forward while rotating with respect to the seat back frame 11, that is, the lower link 53 makes the head rest 43 protrude forward by rotating the head rest module 40.

Further, as the head rest module 40 is rotated by the lower link 53, the upper link 53 connected with the stay guide 41 by the fifth hinge pin 65 rotates about the fourth hinge pin 64, so that the head rest module 40 moves down, including the stay guide 41.

That is, as the head rest 43 may be moved to protrude forward by the rotation of the lower link 53, the head rest 43 may be simultaneously moved down while protruding forward by the rotational force of the upper link 53.

As described above, moving down the head rest 43 by means of the rotational force of the upper link 53 may be for moving the head rest 43 to the head of a passenger after reclining of the seat back 2*a*, which allows the passenger's head to be easily supported by the head rest 43.

Further, the reclining apparatus of a head rest according to an exemplary embodiment of the present invention further includes a guide frame 70 that has one end fixed to the upper portion of the seat back frame 11 and the other end protruding forward ahead of the seat back frame and through which the head rest stay 41 may be vertically disposed to be guided when the angle of the head rest module 40 is adjusted forward/rearward.

A forward stopper 71 restricting the forward movement of the head rest module 40 is integrally formed with the guide frame 70. Further, a rear stopper restricting the rearward movement of the head rest module 40 is the portion, to which one end of the guide frame 70 is coupled, of the seat back frame 11.

The operation of an exemplary embodiment of the present invention is described hereafter.

Figure 3:
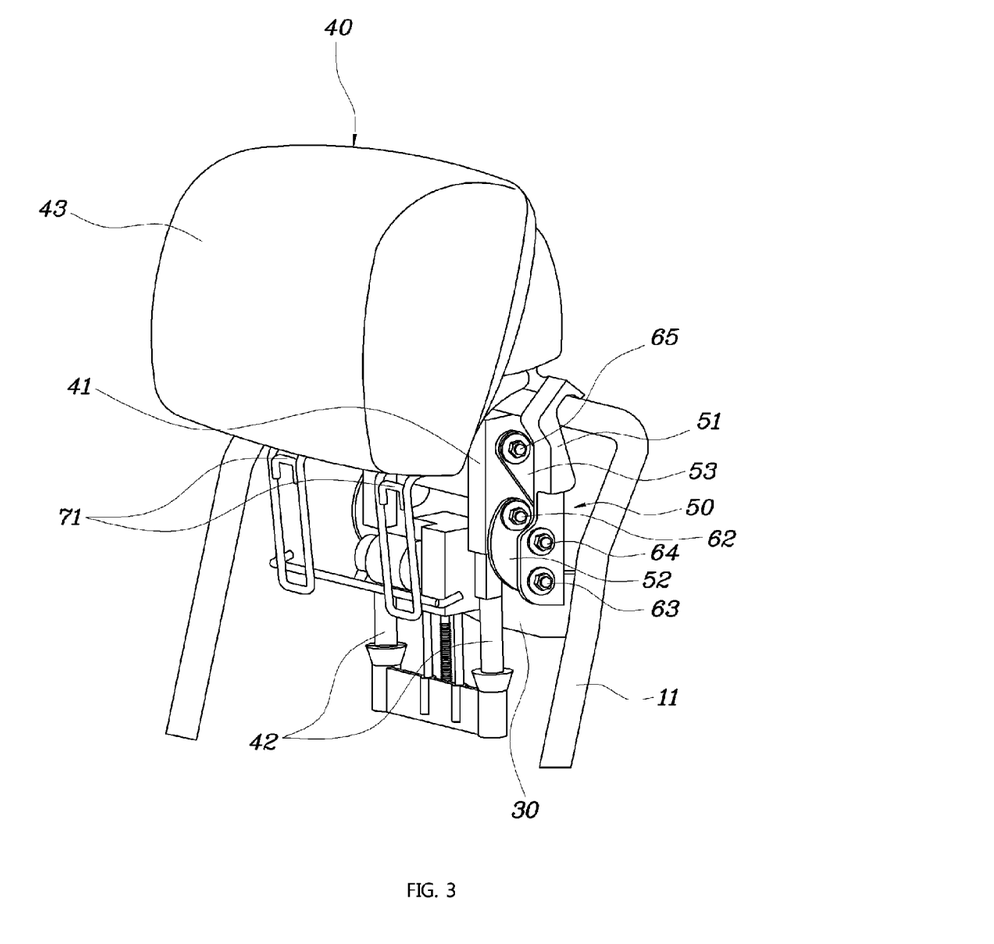
FIG. 3 is a view showing a reclining apparatus of a head rest for a rear seat according to an exemplary embodiment of the present invention prior to operation.
Figure 4:
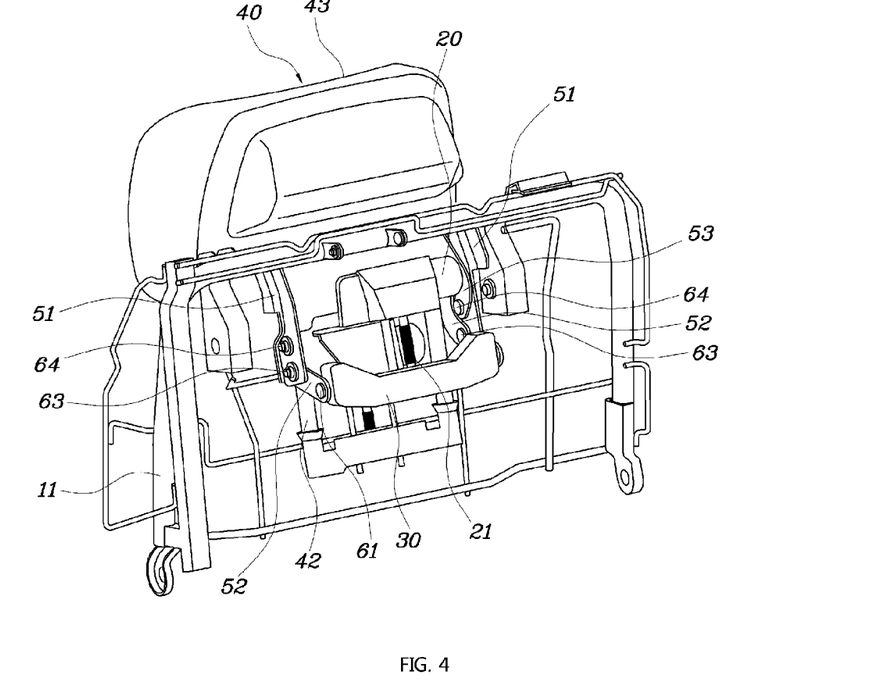
FIG. 4 is a rear view of FIG. 3.
Figure 5:
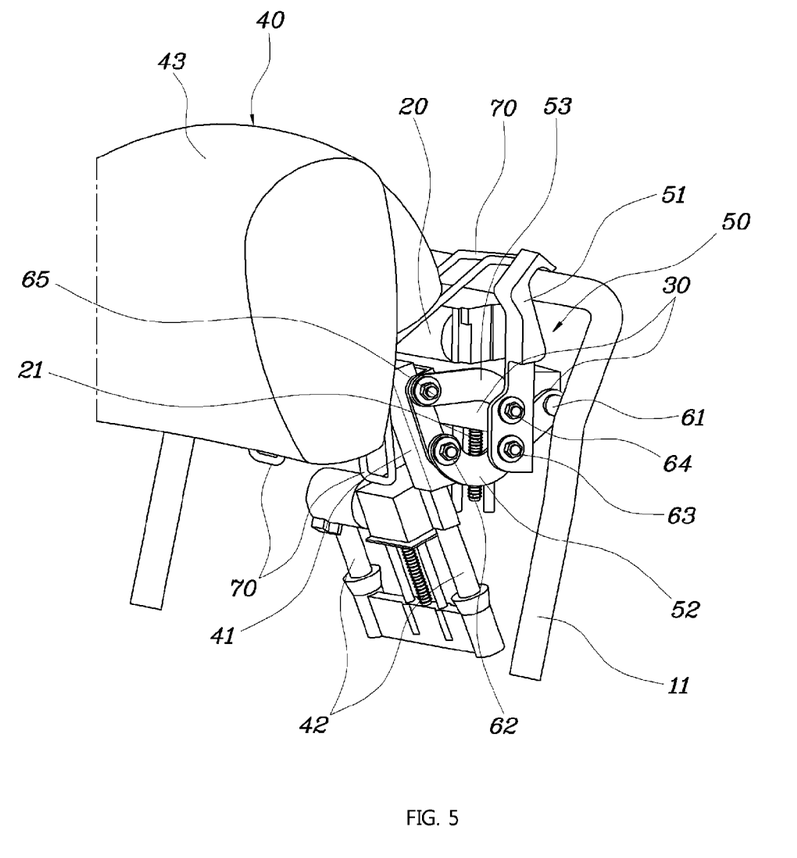
FIGS. 5 and 6 are views showing the reclining apparatus of a head rest according to an exemplary embodiment of the present invention after operation.
Figure 6:
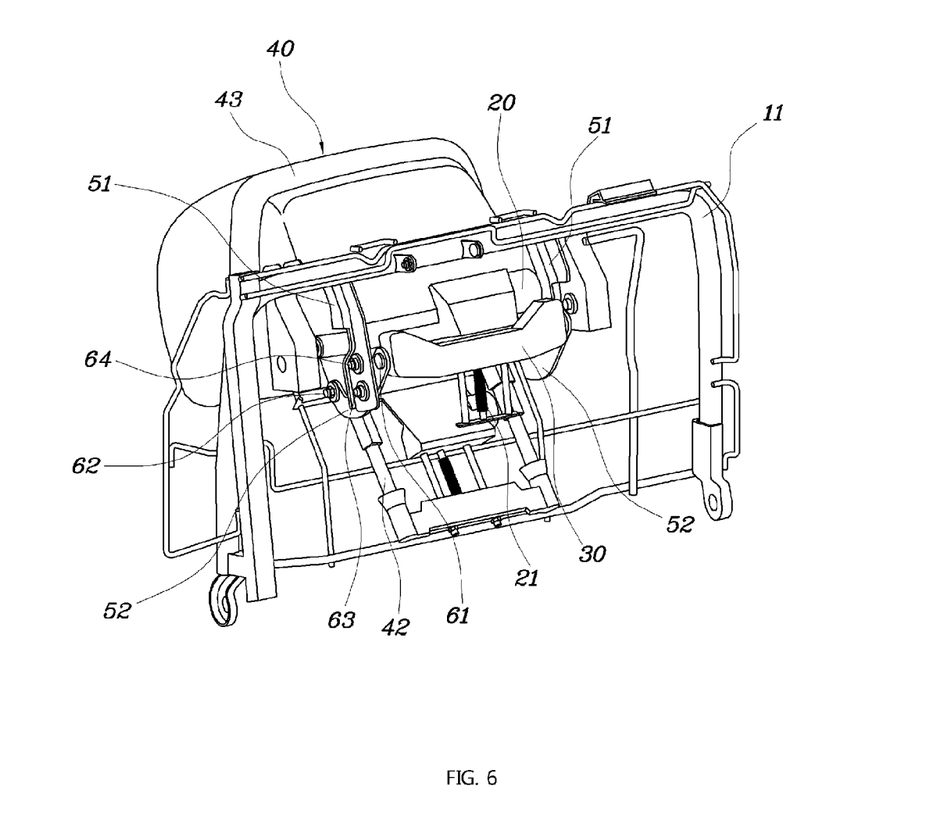
Figure 7:
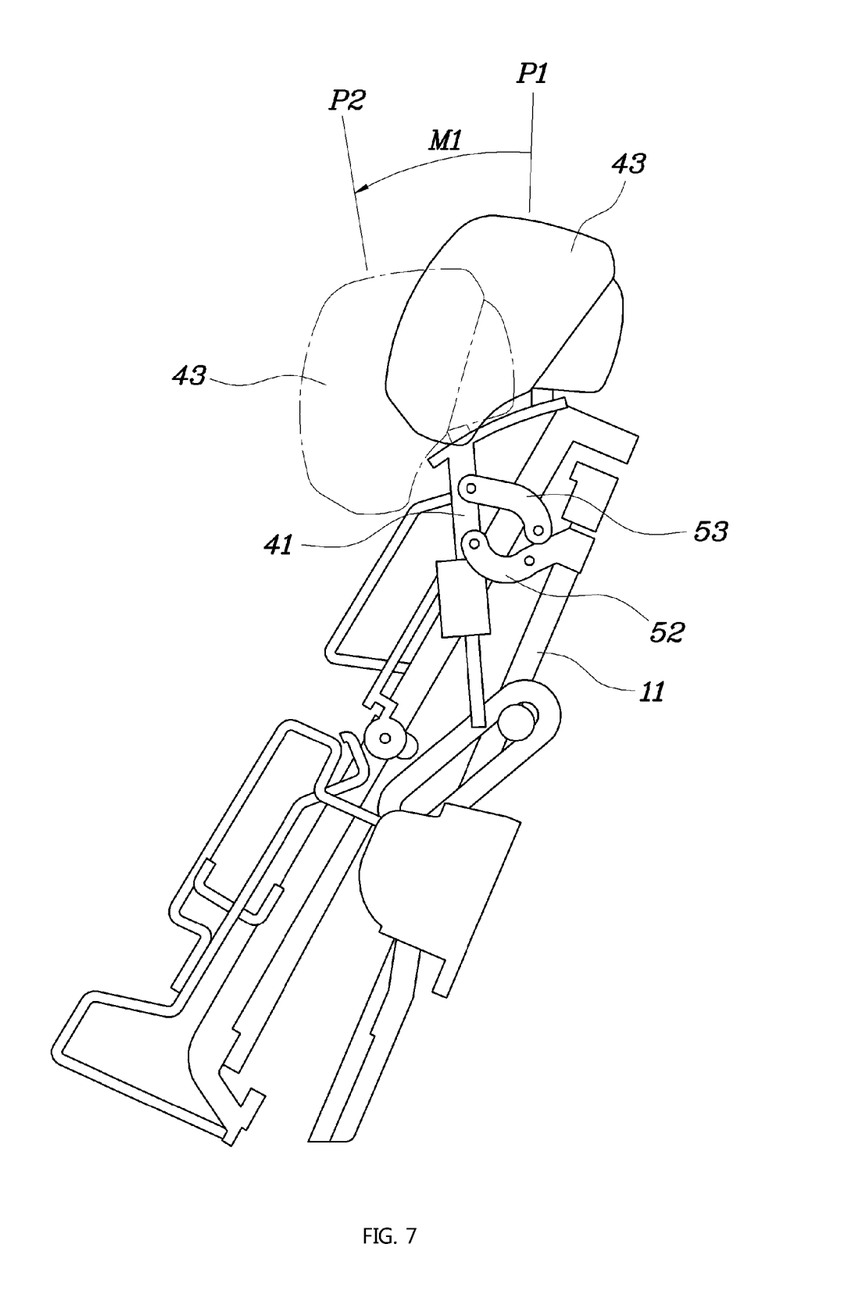
FIG. 7 is a view comparing the states before and after the operation of the reclining apparatus of a head rest according to an exemplary embodiment of the present invention.
Figure 8:
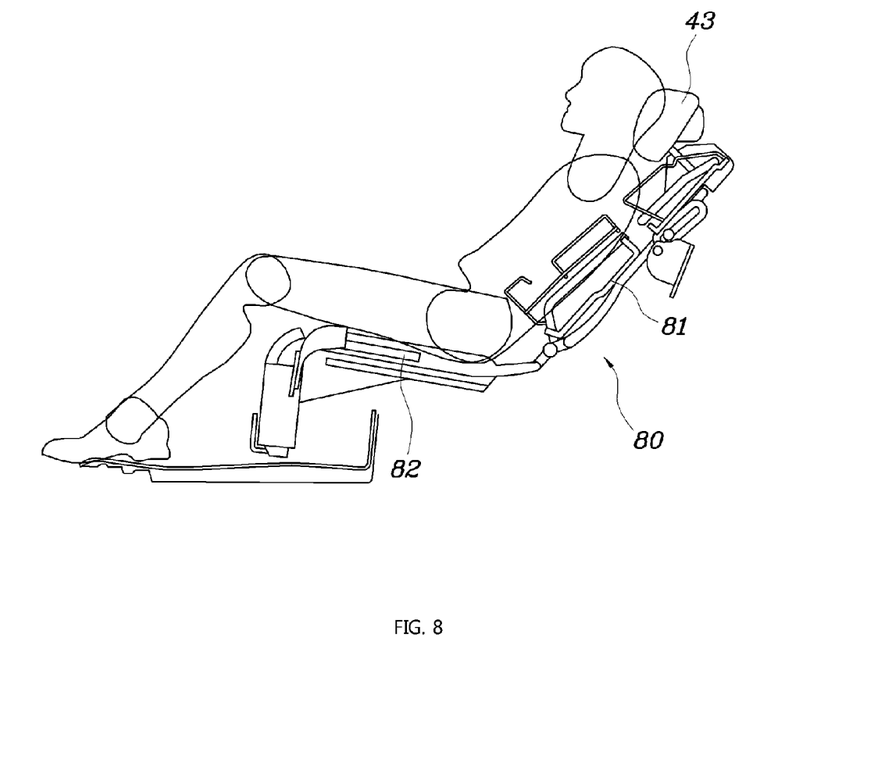
FIG. 8 is a view showing a passenger using a reclining head rest according to an exemplary embodiment of the present invention.

FIGS. 3 and 4 show the states before reclining without the headrest 43 protruding forward. For example, as the reclining motor 20 is driven by a user's operation of a switch, the lead screw 21 rotates, and the carrier 30 moves up over the seat back frame 11 along the lead screw 21, as shown in FIGS. 5 and 6, the head rest 43 of the head rest module 40 protrudes while being rotated forward by the rotation of the lower link 53 and the head rest 43 is moved down by the rotation of the lower link 53. That is, the head rest 43 in the state P1 before operation, as shown in FIG. 7, is moved down while protruding forward into the state P2 after operation by the rotation of the link module 50 (arrow M1).

As described above, the head rest 43 has protruded by rotating forward the lower link 52 and has been moved down by the upper link 53, which has moved toward the head of a passenger, with the seat cushion 81 of the rear seat 80 slid forward and the seat beck 82 declined rearward by the movement of the seat cushion 81, so that the head rest 43 after reclining can sufficiently support the passenger's head.

Therefore, the reclining apparatus of a head rest according to an exemplary embodiment of the present invention can support the head of a passenger in the rear seat 80 to be always comfortable by adjusting the angle of the head rest 43, so that it is possible to considerably improve convenience for the passenger and corresponding improve commercial value of a vehicle.

According to the reclining apparatus of a head rest for a rear seat of the present invention, it is possible to support the head of a passenger in the rear seat to be always comfortable by adjusting the angle of the heard rest, so that it is possible to considerably improve convenience for the passenger and corresponding improve commercial value of a vehicle.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A reclining apparatus for a head rest of a rear seat, comprising:
    a reclining motor operably coupled to an integral lead screw;
    a carrier thread fastened to the integral lead screw;
    a link module configured to transmit operation force from the carrier to a head rest module, wherein the head rest module angle is adjusted in a forward/rearward direction by the operation force from the carrier and the link module;
    a stay guide coupled with the link module;
    a head rest stay movable along the stay guide through the stay guide; and
    a head rest integrally connected to an upper portion of the head rest stay,
    wherein the link module comprises:
        a link bracket with one end fixed to the upper portion of a seat back frame and the other end protruding down;
        a lower link with one end rotatably connected to the carrier, the other end rotatably connected to the head rest module, and a middle portion rotatably connected to the link bracket; and
        an upper link positioned over the lower link, with one end rotatably connected to the link bracket and the other end rotatably connected to the head rest module.

2. The reclining apparatus according to claim 1, further comprising:
    a guide frame having one end fixed to the upper portion of the seat back frame and the other end protruding forward ahead of the seat back frame and through which the head rest stay is vertically disposed to be guided when the angle of the head rest module is adjusted forward/rearward.

3. The reclining apparatus according to claim 2, wherein a forward stopper configured to restrict forward movement of the head rest module is integrally formed with the guide frame and the portion, to which one end of the guide frame is coupled, of the seat back frame is a rear stopper configured to restrict the rearward movement of the head rest module.

* * * * *